(12) United States Patent
Hohmann et al.

(10) Patent No.: US 11,466,711 B2
(45) Date of Patent: Oct. 11, 2022

(54) CLAMPING DEVICE FOR A SCREW CONNECTION

(71) Applicants: Jörg Hohmann, Meschede (DE); Frank Hohmann, Warstein (DE)

(72) Inventors: Jörg Hohmann, Meschede (DE); Frank Hohmann, Warstein (DE)

( * ) Notice: Subject to any disclaimer, the term of this patent is extended or adjusted under 35 U.S.C. 154(b) by 286 days.

(21) Appl. No.: 16/855,132

(22) Filed: Apr. 22, 2020

(65) Prior Publication Data

US 2020/0347859 A1 Nov. 5, 2020

(30) Foreign Application Priority Data

Apr. 30, 2019 (DE) .................... 10 2019 111 185.4

(51) Int. Cl.
| | |
|---|---|
| *F16B 2/06* | (2006.01) |
| *B25B 17/00* | (2006.01) |
| *B25B 29/02* | (2006.01) |
| *B23P 19/06* | (2006.01) |

(52) U.S. Cl.
CPC ................ *F16B 2/06* (2013.01); *B23P 19/06* (2013.01); *B25B 17/00* (2013.01); *B25B 29/02* (2013.01)

(58) Field of Classification Search
CPC . F16B 2/06; B23P 19/06; B25B 17/00; B25B 29/02
See application file for complete search history.

(56) References Cited

U.S. PATENT DOCUMENTS

| | | | | |
|---|---|---|---|---|
| 5,075,950 | A * | 12/1991 | Steinbock | B25B 29/02 29/446 |
| 5,452,629 | A * | 9/1995 | Heiermann | G01B 7/02 81/57.38 |
| 7,661,336 | B2 * | 2/2010 | Hohmann | B23P 19/067 81/57.38 |
| 8,375,554 | B2 * | 2/2013 | Wagner | B25B 29/02 29/525.11 |
| 9,248,532 | B2 | 2/2016 | Wagner et al. | |
| 9,623,524 | B2 * | 4/2017 | Hohmann | B25B 21/002 |
| 2008/0006122 | A1 * | 1/2008 | Hohmann | B23P 19/067 81/57.38 |

\* cited by examiner

*Primary Examiner* — Bayan Salone
(74) *Attorney, Agent, or Firm* — Gudrun E. Huckett

(57) ABSTRACT

A clamping device for a screw connection, provided with a threaded bolt and a threaded nut, has a support tube surrounding the threaded nut, a cylinder housing arranged in an extension of the support tube, a piston movable in the cylinder housing by hydraulic pressure, an exchange bushing axially entrainable by the piston and provided with an internal thread for screwing the exchange bushing to the threaded bolt, and a follower element arranged inside the support tube and frictionally or with form fit connectable to the threaded nut. A drive element is rotatably mounted outside the support tube and provided with a tool surface for applying a hand tool. A gear arrangement is located between the drive element and the follower element. The gear arrangement has a clutch operating as a function of torque to prevent reliably excessive forces when the threaded nut is re-tightened and/or screwed on.

20 Claims, 4 Drawing Sheets

CLAMPING DEVICE FOR A SCREW CONNECTION

BACKGROUND OF THE INVENTION

The invention relates to a clamping device for a screw connection comprised of a threaded bolt and a threaded nut, having a support tube surrounding the threaded nut, a cylinder housing arranged in the extension of the support tube, a piston which is movable in the cylinder housing by means of hydraulic pressure, an exchange bushing which is axially entrainable by the piston and which is provided with an internal thread for screwing the exchange bushing to the threaded bolt, a follower element which is arranged inside the support tube and which is non-positively (frictionally) or positively (with form fit) connectable to the threaded nut, and a gear arrangement between a drive element, which is rotatably mounted outside the support tube and which is provided with a tool surface for applying a hand tool, and the follower element.

Clamping devices for clamping screw connections which have these features are disclosed in U.S. Pat. No. 7,661,336 or 8,375,554. The clamping device has a hydraulic clamping cylinder which is provided externally with a gear mechanism. Whilst hydraulic pressure is fed into the clamping cylinder, the threaded nut is screwed on. To this end, a follower element in the form of a rotary sleeve surrounding with form fit the threaded nut is located in a support tube which forms the lower part of the clamping cylinder. The rotary sleeve is driven manually by means of a torque wrench applied to a tool surface, wherein a gear arrangement forms the drive path between the tool surface for the torque wrench and the rotary sleeve. A drive housing is fastened externally on the clamping device for receiving and rotationally mounting the individual gear elements of the gear arrangement. The use of the torque wrench as a manual tool for screwing on the nut permits a pre-adjustment of the trigger value, whereby with correct handling the threaded nut is prevented from being excessively tightened and/or screwed on. However, it is a prerequisite that the torque value which is prescribed for the screw connection is correctly adjusted by preselecting the trigger value. In practice, this is not always guaranteed since the same torque wrench is also used for other purposes, namely for screwing the exchange bushing, which is arranged in the clamping cylinder, onto the free end of the threaded bolt. Thus, it has to be additionally checked whether the trigger value which is currently adjusted on the torque wrench is calibrated either for the one or the other intended purpose. Moreover, whilst a manual torque wrench is able to indicate when a specific torque is reached, it is not able to prevent a torque which exceeds the specific torque.

The screw clamping device according to U.S. Pat. No. 9,248,532 also demonstrates the relevance of the aforementioned problems. It is proposed therein to attach a specific indicator of the maximum torque externally onto the drive housing which receives the gear mechanism for re-tightening the threaded nut.

In a screw clamping device disclosed in U.S. Pat. No. 5,452,629 the threaded nut is not re-tightened and/or screwed on manually but by the use of a specific drive. An electric motor serves as the drive, the power thereof being controlled by monitoring the electrical resistance. The electrical resistance which increases with the drive load is used to interrupt the further supply of power to the electric motor and to thus prevent excessive tightening moments on the threaded nut. The solution proposed in U.S. Pat. No. 5,452,629 is complex in terms of device technology since it requires a separate electrical drive in order to re-tighten and/or screw on the threaded nut, as well as control devices in the electrical supply of the drive.

The object of the invention, in the case of a screw clamping device which operates with a hydraulic clamping cylinder, is to reliably prevent by mechanical means, which are simple in terms of device technology, excessive forces when re-tightening and/or screwing on the threaded nut.

SUMMARY OF THE INVENTION

In order to achieve this object, a clamping device for a screw connection of the aforementioned kind is provided according to the invention with a torque-dependently operating clutch and that is a component of the gear arrangement.

In this clamping device, a torque-dependently operating clutch is a component of the gear arrangement by means of which the threaded nut is screwed on. For example, this clutch may be a friction slip clutch which slips above a specific torque threshold.

In this manner, the torque with which the threaded nut is re-tightened and/or screwed on during the activation of the hydraulic clamping cylinder is subject to a significant limitation which cannot be overcome, even in the case of faulty operation. This limitation is substantially independent of the handling by the user. It is not dependent on the user implementing the adjustments correctly in the first instance, such as, for example, adjusting the correct trigger value in the case of the use of a manual torque wrench. The torque-dependently operating clutch reliably ensures that maximum values may not be exceeded.

The use of a specific torque wrench is not necessary. Instead, even simpler manual tools may be reliably used, provided that these tools are suitable for being applied to the tool surface which is present.

Preferred embodiments of the clamping device are specified in the dependent claims.

According to an embodiment, the torque-dependently operating clutch is configured as an overload clutch and preferably as a slip clutch. This clutch permits the flux of force until a specific torque value has been reached, whereas when this torque value has been exceeded the clutch interrupts the flux of force.

According to a further embodiment, components of the torque-dependently operating clutch are clutch partners which are supported against one another under compressive stress. The first clutch partner is in indirect or direct rotary connection with the drive element. The second clutch partner is in indirect or direct rotary connection with the follower element.

A further embodiment is characterized by means for adjusting the level of compressive stress between the clutch partners.

For a particularly simple design of the torque-dependently operating clutch it is advantageous when the clutch partners are supported against one another under compressive stress exerted by at least one spring element. In this case, the spring element is preferably supported with its first end against a first spring seat and is supported with its second end against a second spring seat. In this case, the spacing of the spring seats relative to one another may be adjustable in order to preselect in this manner the maximum transmissible torque that causes the torque-dependently operating clutch to interrupt the flux of force.

According to a further embodiment, friction surfaces which are supported flat against one another are configured on the clutch partners, respectively.

A further embodiment provides a drive housing which encloses at least parts of the gear arrangement. The drive housing is fastened externally to a peripheral region of the support tube, the support tube being provided with an opening thereon. A gear element of the gear arrangement extends into the opening. This gear element is preferably in engagement with the follower element.

According to a variant, the drive element and the torque-dependently operating clutch are arranged in the drive housing.

In an alternative variant, the drive element and the torque-dependently operating clutch are components of a clutch module which is releasably applied to the drive housing.

In this alternative variant, a form-fit connection element which is releasably engaged with a gear element which is mounted in the drive housing is also a component of the clutch module, wherein the torque-dependently operating clutch is arranged between the drive element and the form-fit connection element.

Finally, it is proposed that the follower element is a rotary sleeve which is rotatably arranged in the support tube and which is provided on its inner face with form-fit connecting structures for connecting to the threaded nut.

BRIEF DESCRIPTION OF THE DRAWINGS

Exemplary embodiments of the invention which are shown in the drawings are described in more detail hereinafter.

DESCRIPTION OF PREFERRED EMBODIMENTS

Figure 1:
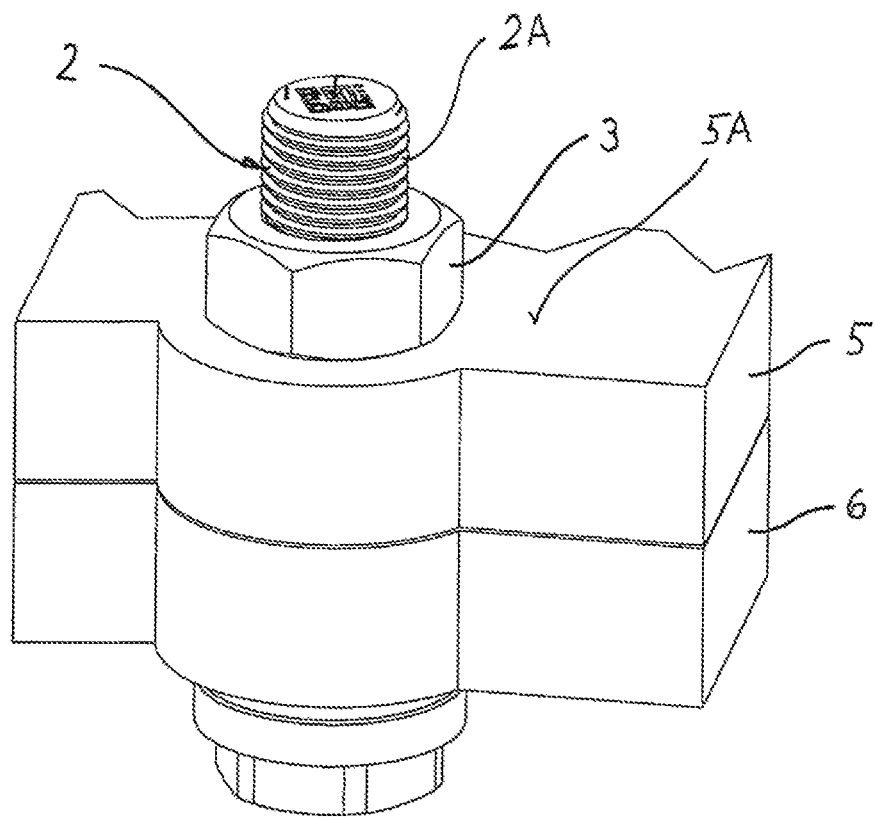
FIG. 1 shows a screw connection comprised of a threaded bolt and a threaded nut.

The screw connection according to FIG. 1 comprises a threaded bolt 2, which is comprised of, for example, a widened bolt head and a shank portion and a threaded portion, and a threaded nut 3 which is screwed onto the threaded portion of the threaded bolt 2. The screw connection in this case braces two machine parts 5, 6, for example, two flanges, relative to one another.

In addition to the threaded bolt 2 and the threaded nut 3 screwed thereon, the screw connection may comprise further elements, for example, a further nut on the side of the machine parts 5, 6 to be braced, remote from the threaded nut 3. Additional washers may also be provided as components of the screw connection.

The screw connection is longitudinally extended by applying an exclusively axial tensile force by means of a clamping device 11 which is designed as a hydraulic clamping cylinder. In this case, the threaded bolt 2 is longitudinally extended by the axial tension on the threaded portion 2A of the threaded bolt 2 protruding beyond the threaded nut 3, wherein primarily the shank portion and the threaded portion of the threaded bolt 2 are extended (lengthened). The tightening force applied in this case and/or the tightening pressure applied by means of the hydraulic system may be stored automatically in a documentation module by the use of an evaluation unit and is thus available for subsequent monitoring purposes.

Whilst a predetermined pretensioning force is exerted on the threaded bolt 2 by activating the clamping cylinder for a certain length of time, the threaded nut 3 may be tightened and/or re-tightened by rotation. This so-called screwing-on of the nut is carried out manually by means of a hand tool 10, for example, a polygonal socket wrench with or without an integrated ratchet mechanism. The tightening moment which is actually applied for screwing on the nut 3 may also be automatically stored in the documentation module.

An exchange bushing 12 which is centrally arranged in a longitudinally movable manner in a cylinder housing 7 of the clamping device is provided at one end with an internal thread 13. Prior to the clamping process, the exchange bushing 12 is screwed with the internal thread 13 onto the threaded end portion 2A protruding over the nut 3. This screwing-on process is also carried out by the hand tool 10, for which purpose the exchange bushing 12 has at its other end a polygonal drive mechanism 14 to which the hand tool 10 can be applied.

During the clamping process, the exchange bushing 12 which is screwed onto the threaded bolt 2 is subjected to axial tension by hydraulic pressure, whereby the threaded bolt 2 is extended in its longitudinal direction. This causes the lower face of the nut 3 to become detached from the support 5A. In this state, the nut 3 may be rotated with relatively little resistance and may be screwed on until it bears against the support 5A once again without a gap being present. Screwing on is carried out by means of the hand tool 10. The rotating or pivoting movement thereof is transmitted via an interposed gear arrangement 15 into a rotational movement of the threaded nut 3.

The direct rotation of the nut 3 is carried out by a follower element 16 mounted in a support tube 8. The follower element 16 in the embodiment described here is a rotary sleeve which surrounds the nut 3 and which is provided on its inner face with form-fit connecting structures, and in particular with a hexagon which engages with form fit the hexagon integrally formed on the nut 3. The follower element or the rotary sleeve 16 is driven by a gear element 17 of the gear arrangement 15 configured as a pinion. The gear arrangement 15 is primarily located in a drive housing 18 which is fastened as a module externally on the clamping cylinder of the clamping device.

The hydraulic clamping mechanism is enclosed by the pressure-resistant cylinder housing 7. Its rigid extension in downward direction forms the support tube 8 surrounding the threaded nut 3. The support tube 8 may be integral with the cylinder housing 7 or a component separate from the cylinder housing 7, for example, attached thereto. The support tube 8 is open at its lower face and is supported with this lower face on the fixed support 5A, the nut 3 also being supported thereon with its lower face.

A hydraulic connection 20 is located at the cylinder housing 7, a hydraulic working chamber 21 being connected thereby to an external hydraulic supply, for example, a hydraulic pump, controlled by a valve.

A piston 25, which is movable in the longitudinal direction and which is sealed toward the cylinder internal wall, is arranged in the cylinder housing 7. By feeding hydraulic pressure into the hydraulic working chamber 21 of the clamping cylinder, the piston 25 is raised. This may take place, for example, counter to the force of a spring which acts on the piston 25 from above and which serves as a piston restoring spring and aims to hold the piston 25 in its basic position in which the hydraulic working chamber 21 is at a minimum.

The piston 25 surrounds the exchange bushing 12 in an annular manner. On its internal edge the piston is provided with a shoulder or a step 27, which remote from the support 5A, forms a follower element surface on which the exchange bushing 12 is supported. When the hydraulic pump feeds hydraulic fluid into the working chamber 21, the piston 25 is raised and axially entrains the exchange bushing 12. This results in the longitudinal extension of the threaded bolt 2.

The exchange bushing 12 is provided at its end facing the bolt with the internal thread 13 for screwing onto the threaded bolt 2. At its other end, the exchange bushing 12 is provided with a polygonal drive element 14 to which the hand tool 10 may be applied in order to rotate the exchange bushing 12 with the hand tool 10 and to screw the exchange bushing onto the threaded bolt 2 during the set-up of the clamping process.

For rotating the rotary sleeve 16, the support tube 8 has an opening 28 at the peripheral region where the drive housing 18 with the gear arrangement 15 is located. Thus, the rotary sleeve 16 is driven through the opening 28. The gear arrangement 15 thus forms together with the rotary sleeve 16 a device for screwing on the nut 3. Naturally, the nut 3 may only be feasibly screwed on as long as the piston 25 is under hydraulic pressure.

The force required for the screwing-on action, for example, by moving to and fro the hand tool 10 which is configured as a ratchet wrench, is applied until a torque limitation excludes any further increase. To this end, a component of the gear arrangement 15 is a torque-dependently operating clutch 30 configured as an overload clutch.

Figure 3:
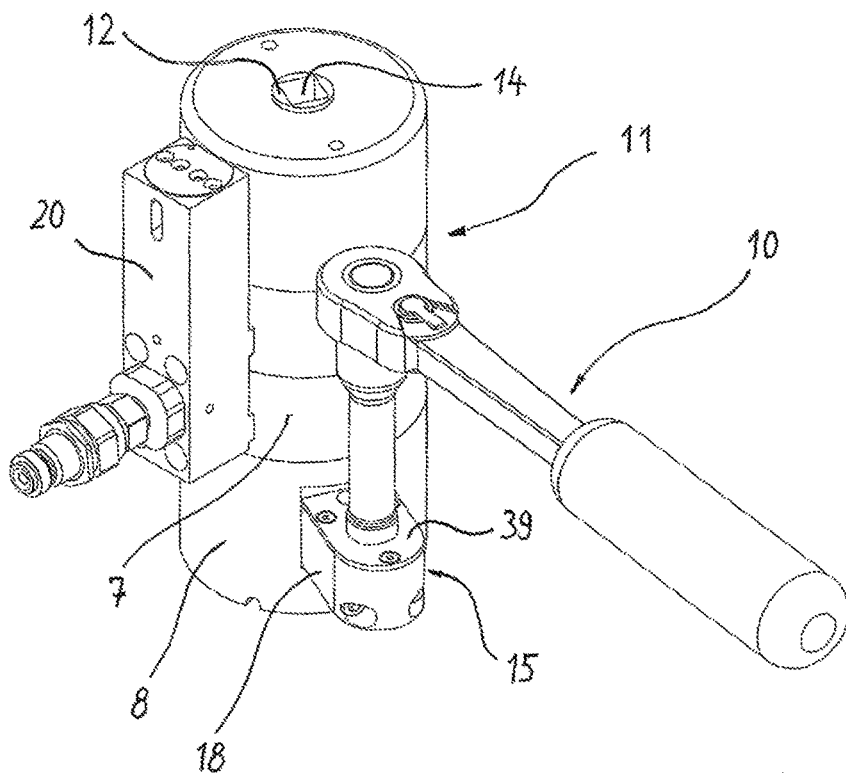
FIG. 3 shows in a perspective view the clamping device which is provided externally with a drive housing and which is positioned onto the screw connection, as well as a hand tool which is applied to the drive housing for re-tightening and/or screwing on the threaded nut of the screw connection.
Figure 5:
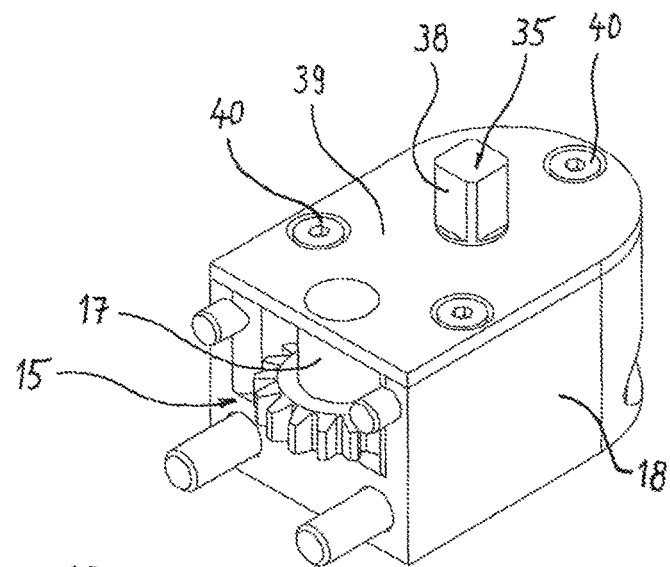
FIG. 5 shows the drive housing in a perspective view.
Figure 4:
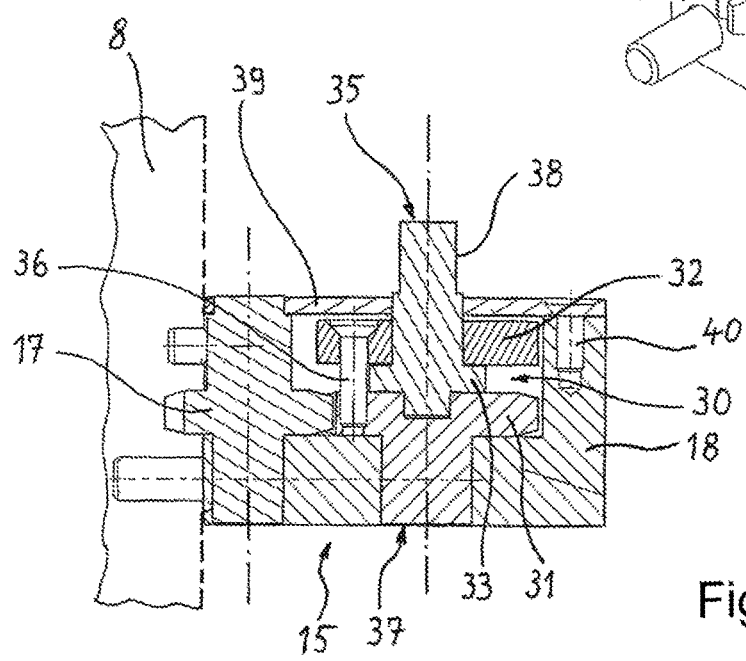
FIG. 4 shows a section through the drive housing of the clamping device.

With reference to FIGS. 3, 4, and 5, details of the gear arrangement 15 are described in a first embodiment.

Figure 2:
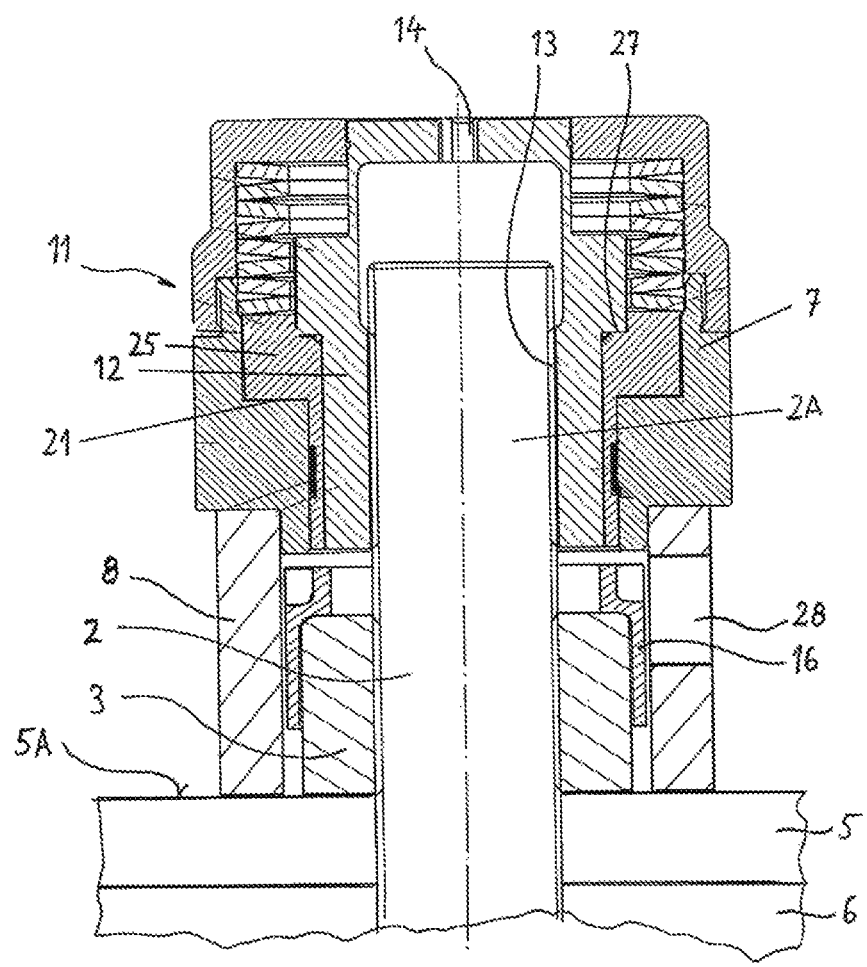
FIG. 2 shows in a longitudinal section the principal construction of the clamping cylinder of the clamping device.

In the drive housing 18 which is fastened externally to the support tube 8, the gear element 17 and a further gear element 37 are mounted on two rotational axes which are parallel to one another. The gear elements 17, 37 are gear pinions meshing with each other. The gear element 17 additionally meshes with a toothing which is configured externally on the rotary sleeve 16. To this end, the gear element 17 protrudes into the opening 28 (FIG. 2) with which the support tube 8 is provided at this peripheral position.

The gear element 37 is of multi-piece configuration and, inter alia, comprises a tool surface 38 to which the hand tool 10 may be applied with its correspondingly shaped tool surface.

The drive path inside the gear arrangement 15 is such that the gear element 37 is set in rotation by means of the hand tool 10 applied to the tool surface 38 and this movement is transmitted via the interposed gear element 17 to the rotary sleeve 16 mounted in the support tube 8. By means of the gear element 17 as an intermediate pinion, it is ensured that the rotational direction on the tool surface 38 is oriented in the same direction as the rotational direction of the threaded nut 3 when screwed on.

In the embodiment according to FIGS. 3, 4, and 5, the torque-dependently operating clutch 30 is integrated in the gear element 37 which is a multi-piece gear element. Components of the multi-piece gear element 37 are a first disc 31, which is provided on its periphery with a toothing, a second disc 32, which is coupled fixedly in terms of rotation to the first disc 31, and a third disc 33, which is arranged between the discs 31, 32.

The three discs 31, 32, 33 with their friction surfaces bearing flat against one another are the clutch partners of the overload clutch. The central disc 33 forms with its two friction surfaces the first clutch partner. Moreover, the flat side of the disc 31 bearing against the central disc 33 is a friction surface and the flat side of the disc 32 bearing against the central disc 33 is also a friction surface. Thus, the discs 31, 32 which are fixed in terms of rotation relative to one another form together the second clutch partner which is in indirect rotary connection with the rotary sleeve 16 via the interposed gear element 17.

According to FIG. 4, the disc 31 is not only the second clutch partner but with its toothing is at the same time the pinion which produces the rotary connection with the rotary sleeve 16 via the interposed gear mechanism element 17.

The central disc 33 of the clutch is an integral component of a drive element 35 which is rotatably mounted in the drive housing 18. The tool surface 38 to which the hand tool 10 may be applied is configured on the drive element 35, in this case outside the gear mechanism housing 18.

Screws 36, which have a screw axis parallel to the clutch rotational axis, connect the external discs 31, 32 together without coming into contact with the central disc 33. By tightening the screws 36, the discs 31, 32 are pulled more tightly together, whereby the pressure thereof on the central disc 33 is increased. This pressure and thus the friction between the discs 31, 32, 33 determines the maximum torque which may be transmitted by the torque-dependently operating clutch 30, i.e., transmitted until slippage occurs.

In practice, a change of the pressure and thus of the friction between the clutch partners 31, 32, 33 of the overload clutch is seldom required or even undesired. Thus, in order to change the clutch force, the screws 36 are only accessible when a cover 39, which is a component of the drive housing 18, is initially removed. The cover 39 is in turn secured by screws 40.

Figure 6:
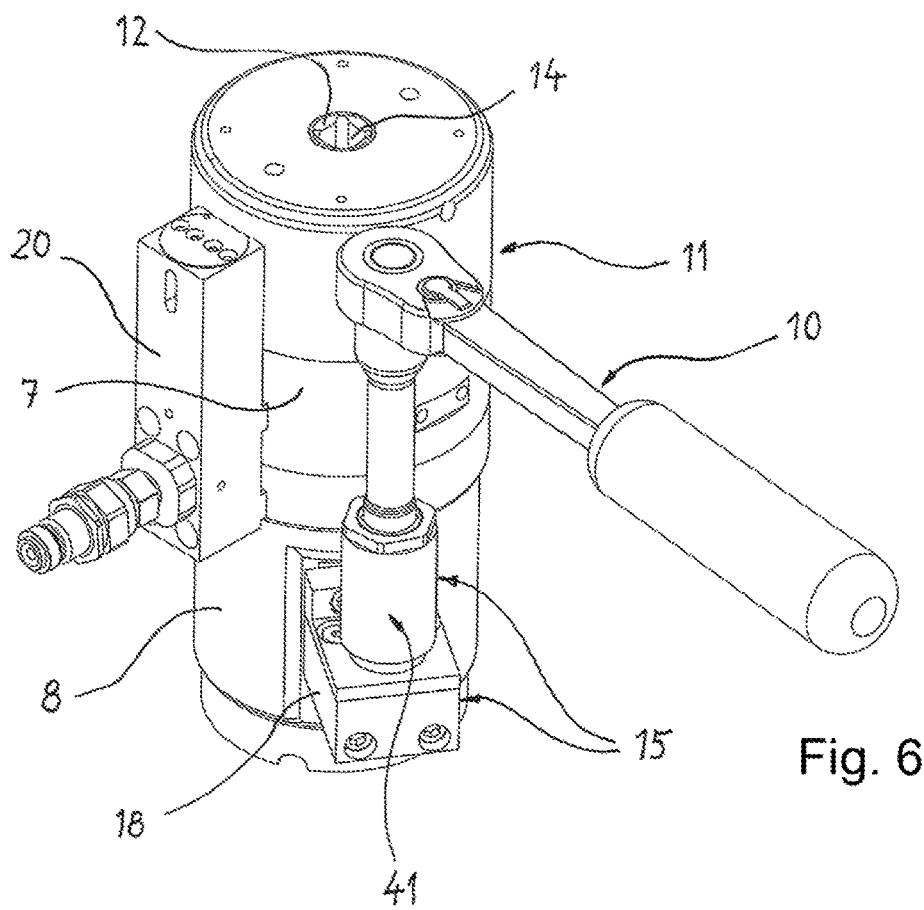
FIG. 6 shows in a perspective view a further variant of the clamping device which is positioned on the screw connection, as well as a hand tool which is applied to the device for re-tightening and/or screwing on the threaded nut of the screw connection.
Figure 7:
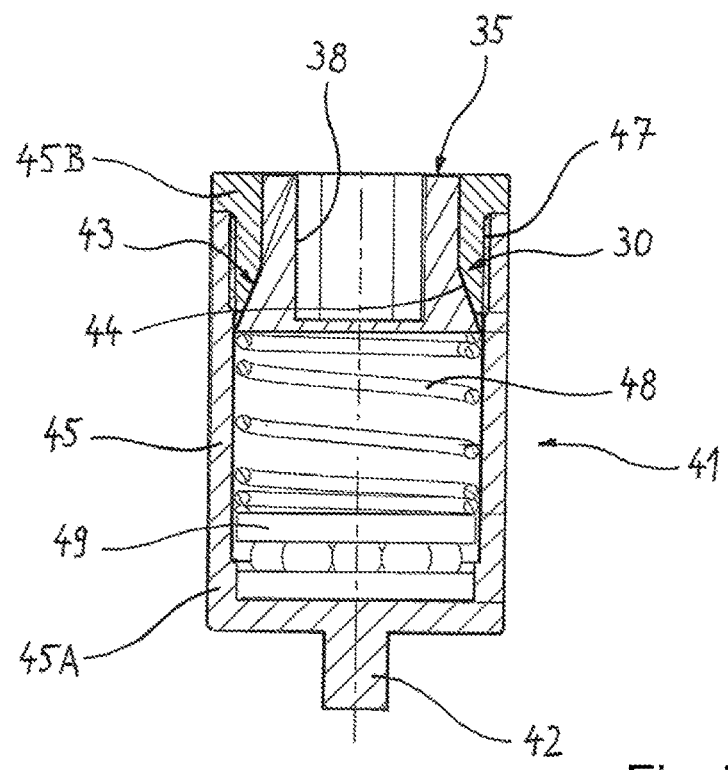
FIG. 7 shows a section through a clutch module used according to FIG. 6.

A second embodiment of the gear arrangement 15 is described hereinafter with reference to FIGS. 6 and 7.

In this embodiment the drive element 35, which is provided with the tool surface 38 for applying the hand tool 10, and the torque-dependently operating clutch 30 are components of a clutch module 41. The clutch module 41 is releasably attached to the drive housing 18. The individual parts of the gear arrangement 15 are partially located in the drive housing 18, which is fastened to the support tube 8, and partially located in the separate clutch module 41.

A component of the clutch module 41 is a one-piece or multi-piece housing 45. The housing 45, remote from the drive element 35 which is rotatable therein, is provided with a form-fit connection element 42, for example, a square; this form-fit connecting element 42 is configured rigidly on the housing 45. When according to FIG. 6 the clutch module 41 is attached to the drive housing 18, the form-fit connection element 42 engages in a corresponding mating structure on the gear element 37 configured as a pinion (FIG. 4).

The torque-dependently operating clutch 30 operates in the second embodiment with two conical friction surfaces. The drive element 35 which is provided with the tool surface 38 has a first cone. This cone forms the first clutch partner 43 of the overload clutch. A corresponding cone on the one-piece or multi-piece housing 45 forms the second clutch partner 44 which is in indirect rotary connection with the rotary sleeve 16 via the interposed gear elements 37, 17.

The transmissible torque is adjustable, for which purpose a spring element 48 is supported with its first end against the drive element 35 and is supported with its second end against a spring seat on the housing 45. In order to prevent a twisting of the spring element 48, the spring element 48 on the housing side is not directly supported against the housing 45 but against an axial bearing 49 which, in turn, is supported in the housing 45.

The spacing of the spring seats and thus the length of the spring element 48 is adjustable. In this regard, the housing 45 is divided into two and is thus comprised of housing parts 45A, 45B screwed together via a thread 47.

In the two described embodiments, a gear element of the gear arrangement 15 may be provided with a rotary angle sensor. This rotary angle sensor detects the total rotary angle which is covered during the course of the tightening of the nut 3, until the maximum torque value is reached. The detected rotary angle may either be the rotary angle of the rotary sleeve 16, and thus of the nut 3 itself, or a rotary angle covered by one of the rotating gear elements of the gear arrangement 15. The angular value thus detected may also be stored in the documentation module.

The specification incorporates by reference the entire disclosure of German priority document 10 2019 111 185.4 having a filing date of 30 Apr. 2019.

While specific embodiments of the invention have been shown and described in detail to illustrate the inventive principles, it will be understood that the invention may be embodied otherwise without departing from such principles.

LIST OF REFERENCE NUMERALS

2 Threaded bolt
2A Threaded end portion
3 Nut, threaded nut
5 Machine part
5A Support
6 Machine part
7 Cylinder housing
8 Support tube
10 Hand tool
11 Clamping device
12 Exchange bushing
13 Internal thread
14 Polygonal drive element
15 Gear arrangement
16 Follower element, rotary sleeve
17 Gear element
18 Drive housing
20 Hydraulic connection
21 Working chamber
25 Piston
27 Step
28 Opening
30 Torque-dependently operating clutch
31 Disc, second clutch partner
32 Disc, second clutch partner
33 Disc, first clutch partner
35 Drive element
36 Screw
37 Gear element
38 Tool surface
39 Cover
40 Screw
41 Clutch module
42 Form-fit connection element
43 Cone, first clutch partner
44 Cone, second clutch partner
45 Housing
45A Housing part
45B Housing part
47 Thread
48 Spring element
49 Axial bearing

What is claimed is:

1. A clamping device for a screw connection comprised of a threaded bolt and a threaded nut, the clamping device comprising:
    a support tube surrounding the threaded nut;
    a cylinder housing arranged in an axial extension of the support tube;
    a piston arranged in the cylinder housing and moveable by a hydraulic pressure;
    an exchange bushing operatively connected to the piston and configured to be axially entrained by the piston, wherein the exchange bushing comprises an internal thread configured to be screwed to the threaded bolt;
    a follower element arranged inside the support tube and configured to be connected frictionally or with form fit to the threaded nut;
    a drive element rotatably mounted outside the support tube and provided with a tool surface configured to be engaged by a hand tool;
    a gear arrangement disposed between the drive element and the follower element, the gear arrangement comprising a torque-dependently operating clutch;
    wherein the clutch comprises a first clutch partner, connected by an indirect or a direct rotary connection to the drive element, and further comprises a second clutch partner, connected by an indirect or a direct rotary connection to the follower element, wherein the first and second clutch partners are supported against one another under compressive stress.

2. The clamping device according to claim 1, wherein the clutch is an overload clutch.

3. The clamping device according to claim 2, wherein the overload clutch is a slip clutch.

4. The clamping device according to claim 1, further comprising means for adjusting the compressive stress between the first and second clutch partners.

5. The clamping device according to claim 1, wherein the clutch comprises at least one spring element applying the compressive stress to the first and second clutch partners.

6. The clamping device according to claim 5, wherein the at least one spring element comprises a first end and a second end, wherein the first end is supported against a first spring seat and the second end is supported against a second spring seat, and wherein the first and second spring seats are positioned at a spacing relative to one another and the spacing is adjustable.

7. The clamping device according to claim 1, wherein the first and second clutch partners each have a friction surface, wherein the friction surfaces are supported flat against one another.

8. The clamping device according to claim 1, further comprising a drive housing configured to enclose at least parts of the gear arrangement, wherein the drive housing is fastened externally to a peripheral region of the support tube, wherein the support tube comprises an opening, wherein a gear element of the gear arrangement extends into the opening.

9. The clamping device according to claim 8, wherein the gear element engages the follower element.

10. The clamping device according to claim 8, wherein the drive element and the clutch are arranged in the drive housing.

11. The clamping device according to claim 1, wherein the follower element is a rotary sleeve which is rotatably arranged in the support tube and comprises an inner face provided with form-fit connecting structures configured to connect to the threaded nut.

12. A clamping device for a screw connection comprised of a threaded bolt and a threaded nut, the clamping device comprising:
- a support tube surrounding the threaded nut;
- a cylinder housing arranged in an axial extension of the support tube;
- a piston arranged in the cylinder housing and moveable by a hydraulic pressure;
- an exchange bushing operatively connected to the piston and configured to be axially entrained by the piston, wherein the exchange bushing comprises an internal thread configured to be screwed to the threaded bolt;
- a follower element arranged inside the support tube and configured to be connected frictionally or with form fit to the threaded nut;
- a drive element rotatably mounted outside the support tube and provided with a tool surface configured to be engaged by a hand tool;
- a gear arrangement disposed between the drive element and the follower element, the gear arrangement comprising a torque-dependently operating clutch;
- a drive housing configured to enclose at least parts of the gear arrangement, wherein the drive housing is fastened externally to a peripheral region of the support tube, wherein the support tube comprises an opening, wherein a gear element of the gear arrangement extends into the opening;
- wherein the drive element and the clutch are components of a clutch module which is releasably attached to the drive housing.

13. The clamping device according to claim 12, wherein the clutch module comprises a form-fit connection element configured to releasably engage a gear element of the gear arrangement, wherein the gear element is mounted in the drive housing, wherein the clutch is arranged between the drive element and the form-fit connection element.

14. The clamping device according to claim 12, wherein the clutch comprises a first clutch partner, connected by an indirect or a direct rotary connection to the drive element, and further comprises a second clutch partner, connected by an indirect or a direct rotary connection to the follower element, wherein the first and second clutch partners are supported against one another under compressive stress.

15. The clamping device according to claim 14, further comprising means for adjusting the compressive stress between the first and second clutch partners.

16. The clamping device according to claim 14, wherein the clutch comprises at least one spring element applying the compressive stress to the first and second clutch partners.

17. The clamping device according to claim 16, wherein the at least one spring element comprises a first end and a second end, wherein the first end is supported against a first spring seat and the second end is supported against a second spring seat, and wherein the first and second spring seats are positioned at a spacing relative to one another and the spacing is adjustable.

18. The clamping device according to claim 14, wherein the first and second clutch partners each have a friction surface, wherein the friction surfaces are supported flat against one another.

19. The clamping device according to claim 12, wherein the clutch is an overload clutch.

20. The clamping device according to claim 19, wherein the overload clutch is a slip clutch.

* * * * *